US011054339B2

(12) United States Patent
Feng et al.

(10) Patent No.: US 11,054,339 B2
(45) Date of Patent: Jul. 6, 2021

(54) METHOD AND APPARATUS FOR MONITORING A MACHINE BEARING ON-VEHICLE

(71) Applicant: GM Global Technology Operations LLC, Detroit, MI (US)

(72) Inventors: Jianshe Feng, Cincinnati, OH (US); Xinyu Du, Oakland Township, MI (US); Mutasim Salman, Rochester Hills, MI (US); Kevin A. Cansiani, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 345 days.

(21) Appl. No.: 16/189,084

(22) Filed: Nov. 13, 2018

(65) Prior Publication Data

US 2020/0149993 A1 May 14, 2020

(51) Int. Cl.
*G01M 13/045* (2019.01)
*G01H 1/00* (2006.01)

(52) U.S. Cl.
CPC ....... *G01M 13/045* (2013.01); *F16C 2233/00* (2013.01); *F16C 2326/02* (2013.01); *G01H 1/003* (2013.01)

(58) Field of Classification Search
CPC ..... G01M 13/045; G01H 1/003; G01N 29/14; F16C 2233/00; F16C 2326/02
(Continued)

(56) References Cited

U.S. PATENT DOCUMENTS

2003/0136192 A1* 7/2003 Tu ............................ G01N 29/12
73/587
2004/0153268 A1* 8/2004 Volkel .................... G01H 1/003
702/75
(Continued)

FOREIGN PATENT DOCUMENTS

CN 1926413 A 3/2007
CN 201262126 Y 6/2009
(Continued)

OTHER PUBLICATIONS

Ming Zhao, Jing Lin, Xiaoqiang Xu and Yaguo Lei, Tacholess Envelope Order Analysis and Its Application to Fault Detection of Rolling Element Bearings with Varying Speeds, article in Sensors 2013, 13 www.mdpi.com/journal/sensors, pp. 10856-10875, dated Jul. 15, 2013, Basel, Switzerland.
(Continued)

*Primary Examiner* — Lisa M Caputo
*Assistant Examiner* — Rose M Miller
(74) *Attorney, Agent, or Firm* — Quinn IP Law

(57) ABSTRACT

A machine bearing disposed on a rotatable member, such as may be present on a vehicle, is described. A method for monitoring a state of health of the machine bearing includes monitoring, via a microphone, an acoustic signal, and coincidently determining a rotational speed of the rotatable member associated with the machine bearing. The sound spectrum is correlated to the rotational speed of the rotating member, and a time-frequency analysis is executed to determine a sound spectrum. The sound spectrum is transformed to a residual spectrum. A first feature associated with a first frequency band and a second feature associated with a second frequency band are extracted from the residual spectrum. The state of health associated with the machine
(Continued)

bearing is detected based upon the first and second features, and is communicated to a second controller.

18 Claims, 6 Drawing Sheets

(58) Field of Classification Search
USPC .................................................. 73/593, 587
See application file for complete search history.

(56) References Cited

U.S. PATENT DOCUMENTS

2008/0033695 A1* 2/2008 Sahara .................... G01H 1/003
   702/185
2019/0311558 A1* 10/2019 Bika ..................... G07C 5/0841

FOREIGN PATENT DOCUMENTS

| CN | 102307055 A | 1/2012 |
| CN | 103969046 A | 8/2014 |

OTHER PUBLICATIONS

Miguel Delgado Prieto, Giansalvo Cirrincione, Antonio Garcia Espinosa, Juan Antonio Orgega, and Humberto Henao, Bearing Fault Detection by a Novel Condition-Monitoring Scheme Based on Statistical-Time Features and Neural Networks, IEEE Transactions on Industrial Electronics, vol. 30, No. 8, Aug. 2013, pp. 3398-3407.

Bo Li, Mo-Yuen Chow, Yodyium Tipsuwan and James C. Hung, Neural-Network-Based Motor Rolling Bearing Fault Diagnosis, IEEE Transactions on Industrial Electronics, vol. 47, No. 5, Oct. 2000, pp. 1060-1069.

S. A. Mc Inerny and Y. Dai, Basic Vibration Signal Processing for Bearing Fault Detection, IEEE Transactions on Education, vol. 46, No. 1, Feb. 2003, pp. 149-156.

R. B. Randall, J. Antoni, and S.Chobsaard, The Relationship Between Spectral Correlation and Envelope Analysis in the Diagnostics of Bearing Faults and Other Cyclostationary Machine Signals, Mechanical Systems and Signal Processing (2001) 15(5), http://www.idealibrary.com, pp. 945-962.

* cited by examiner

METHOD AND APPARATUS FOR MONITORING A MACHINE BEARING ON-VEHICLE

INTRODUCTION

On-vehicle bearings may experience faults in-use. Occurrence of a bearing fault may be gradual. Known methods for detection of a bearing fault often involve an operator who discerns audible or tactile data, from which they may infer an incipient fault. Thus, the ability to detect a bearing fault may be dependent upon sensory capabilities and skill level of an operator. Incomplete bearing fault detection may be exacerbated by absence of a vehicle operator in the case of an autonomous vehicle. Monitoring of bearings is not an element of known on-vehicle monitoring systems.

SUMMARY

A machine bearing that is disposed on a rotatable member, such as may be present on a vehicle, is described. A method for monitoring a state of health of the machine bearing includes monitoring, via a microphone, an acoustic signal, and coincidently determining a rotational speed of the rotatable member associated with the machine bearing. The sound spectrum is correlated to the rotational speed of the rotating member, and a time-frequency analysis is executed to determine a sound spectrum. The sound spectrum is transformed to a residual spectrum. A first feature associated with a first frequency band and a second feature associated with a second frequency band are extracted from the residual spectrum. A state of health associated with the machine bearing is detected based upon the first and second features, and is communicated to a second controller.

An aspect of the disclosure includes capturing the acoustic signal when the rotational speed is at a steady-state condition, and executing, via the controller, the time-frequency analysis of the acoustic signal that is captured when the rotational speed is at the steady-state condition to determine the sound spectrum.

Another aspect of the disclosure includes capturing the acoustic signal for a preset window of time when the rotational speed is at a steady-state condition.

Another aspect of the disclosure includes the first frequency band being a harmonic frequency of the rotational speed of the rotatable member.

Another aspect of the disclosure includes the second frequency band being a harmonic frequency of the rotational speed of the rotatable member.

Another aspect of the disclosure includes transforming the sound spectrum to a residual spectrum by determining a moving average for the sound spectrum, and subtracting the moving average from the sound spectrum to determine the residual spectrum.

Another aspect of the disclosure includes monitoring, via the on-vehicle microphone, the acoustic signal and coincidently determining a rotational speed of the rotatable member associated with the machine bearing when the rotational speed is within a first speed range by extracting first and second features from a residual spectrum associated with the acoustic signal when the rotational speed is within the first speed range, monitoring, via the on-vehicle microphone, the acoustic signal and coincidently determining a rotational speed of the rotatable member associated with the machine bearing when the rotational speed is within a first speed range, extracting third and fourth features from a residual spectrum associated with the acoustic signal when the rotational speed is within the second speed range, detecting a fault associated with the machine bearing based upon the first, second, third and fourth features.

Another aspect of the disclosure includes determining a state of health associated with the machine bearing based upon the first and second features by detecting a fault or degradation associated with the machine bearing based upon the first and second features, and communicating, via the controller, the fault or the degradation associated with the machine bearing to a second controller.

Another aspect of the disclosure includes monitoring a machine bearing that is disposed on a rotatable member of a vehicle, by monitoring, via a plurality of on-vehicle microphones, a plurality of acoustic signals proximal to the machine bearing and coincidently determining a rotational speed of the rotatable member associated with the machine bearing. This includes, for each of the acoustic signals monitored by the plurality of microphones executing, via a controller, a time-frequency analysis of each of the acoustic signals to determine a corresponding sound spectrum and transforming each of the sound spectrums to a corresponding residual spectrum. For each residual spectrum, a first feature associated with a first frequency band is extracted and a second feature associated with a second frequency band is extracted. A fault associated with the machine bearing is detected based upon the first features that are extracted from the frequency/amplitude analyses and the second features that are extracted from the frequency/amplitude analyses, and the result is communicated to a second controller.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
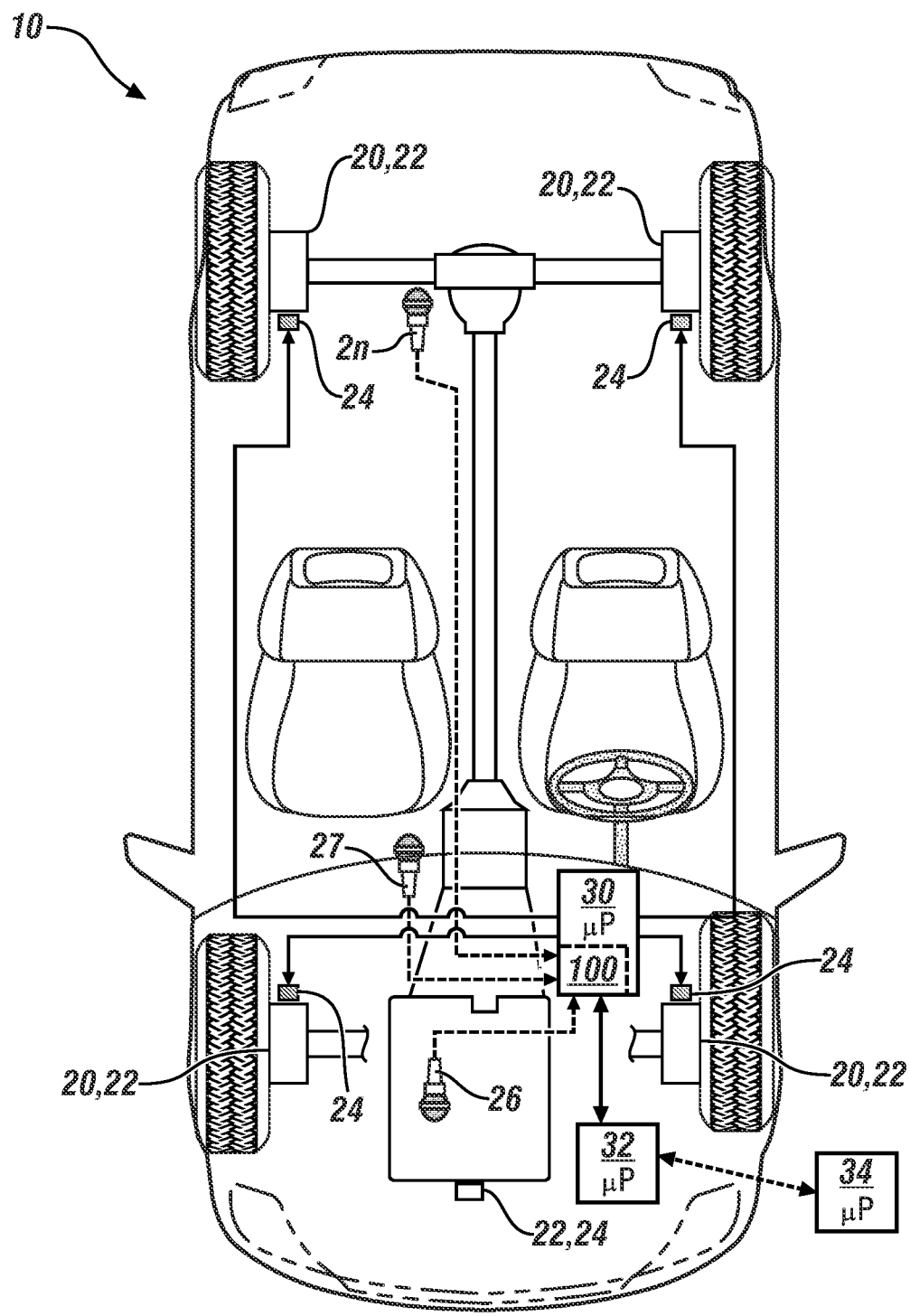
FIG. 1 schematically illustrates a machine bearing monitoring system that is disposed on a vehicle, in accordance with the disclosure.

Referring to the drawings, wherein like reference numerals correspond to like or similar components throughout the several Figures, FIG. 1, consistent with embodiments disclosed herein, illustrates a machine bearing monitoring system 100. In one embodiment, and as described herein, the machine bearing monitoring system 100 may be disposed on a vehicle 10. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. The vehicle 10 may include autonomic control capability, including an on-vehicle control system that is capable of providing a level of driving automation. The terms 'driver' and 'operator' describe the person responsible for directing operation of the vehicle, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle. Driving automation can include some level of automatic control or intervention related to simultaneous control of multiple vehicle functions, such as steering, acceleration, and/or braking, with the driver continuously having overall control of the vehicle. Driving automation can include simultaneous automatic control of vehicle driving functions, including steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle for an entire trip. Driving automation includes hardware and controllers configured to monitor the spatial environment under various driving modes to perform various driving tasks during dynamic operation. Driving automation can include, by way of non-limiting examples, cruise control, adaptive cruise control, lane-change warning, intervention and control, automatic parking, acceleration, braking, and the like.

The vehicle 10 includes a machine bearing 20 that enables friction-free rotational movement of a member, e.g., rotatable member 22 that is rotatably disposed thereon. Non-limiting examples of on-vehicle devices that employ a machine bearing 20 that may be monitored by the machine bearing monitoring system 100 include a wheel bearing that is disposed on a corner of the vehicle, a shaft bearing on an accessory such as an air conditioning compressor, a shaft bearing on an idler or belt tensioner for an engine accessory drive system, etc.

The machine bearing monitoring system 100 includes a position sensor 24 that is disposed to monitor rotational position and speed of the rotatable member 22, a microphone 26, and a controller 30, wherein the position sensor 24 and the microphone 26 are in communication with the controller 30. The controller 30 is in communication with a second controller 32 to communicate with a service provider 34 that may be disposed off-vehicle at a remote location. The controller 30 may also be in communication with an on-vehicle human-machine interface (HMI) device, to communicate with a vehicle operator. The controller 30 is configured to dynamically monitor signals from the position sensor 24 and the microphone 26, and execute algorithmic code to detect and isolate a fault, and notify the vehicle operator and/or the remote service provider of the fault.

The microphone 26 is a device that is configured to capture and convert acoustic sound waves within the audible spectrum (0-40 kHz) into an electrical signal. The microphone 26 may be disposed at a suitable location on the vehicle 10, including, e.g., in the passenger compartment, such as an existing part of an on-vehicle infotainment system or a hands-free telephonic communication system. Alternatively, the microphone 26 may instead be a stand-alone device that is disposed in an underhood location, or in another location. A single microphone or a plurality of microphones may be deployed on-vehicle. Multiple microphones are indicated, including microphone 26, a second microphone 27, and an nth microphone 2n, wherein the nth microphone 2n indicates a third, fourth, fifth, etc. microphone. The position sensor 24 may be a Hall-effect device, a resolver, a potentiometer or another device that is configured to monitor and convert rotational position of the rotatable member 22 to an electrical signal.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form. A parameter is defined as a measurable quantity that represents a physical property of a device or other element that is discernible using one or more sensors and/or a physical model. A parameter can have a discrete value, e.g., either "1" or "0", or can be infinitely variable in value. As employed herein, the term 'speed' refers to rotational speed when applied to the bearing or the rotatable member 22.

Figure 2:
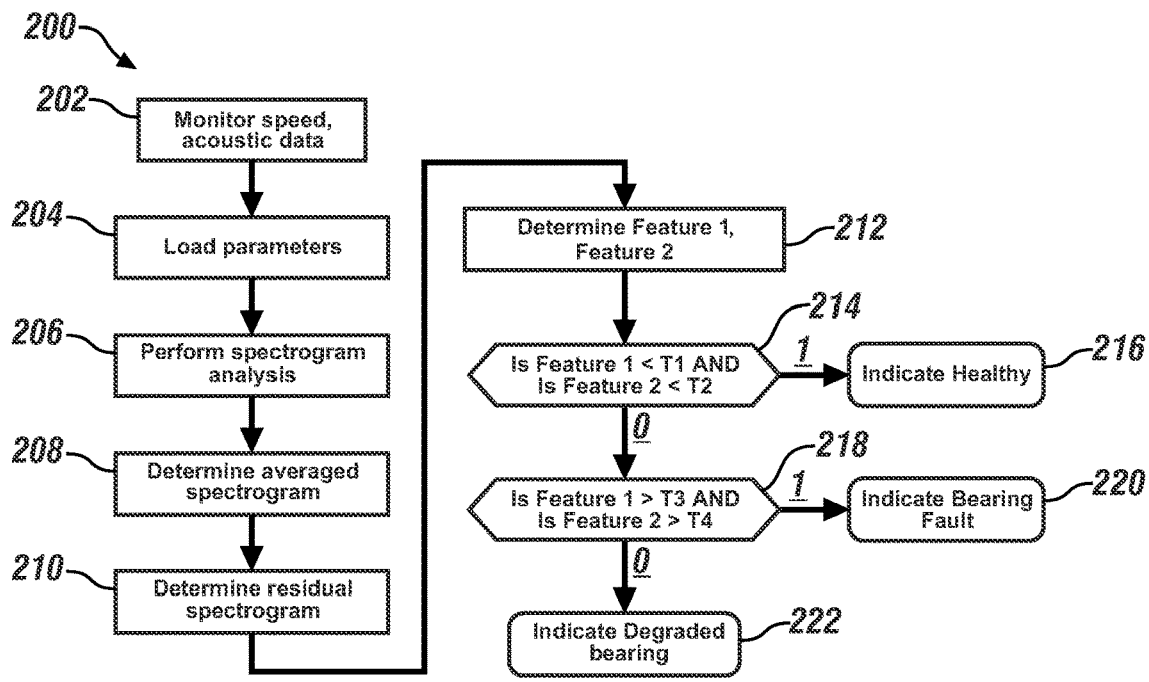
FIG. 2 schematically shows an acoustic-based bearing fault detection routine for assessing health of a bearing employing rotational speed and acoustic data, in accordance with the disclosure.

FIG. 2 schematically shows an acoustic-based bearing fault detection routine 200 for assessing health of a bearing employing rotational speed and acoustic data, employing an embodiment of the machine bearing monitoring system 100 described hereinabove. Table 1 is provided as a key wherein the numerically labeled blocks and the corresponding functions are set forth as follows, corresponding to the acoustic-based bearing fault detection routine 200. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 202 | Monitor bearing member speed, acoustic data |
| 204 | Load parameters |
| 206 | Perform spectrogram analysis |
| 208 | Determine averaged spectrogram |
| 210 | Determine residual spectrogram |
| 212 | Determine maximum value of residual spectrogram within selected frequency bands (Feature 1, Feature 2) |
| 214 | Is Feature 1 < T1 AND Is Feature 2 < T2 |
| 216 | Indicate Healthy |
| 218 | Is Feature 1 > T3 AND Is Feature 2 > T4 |
| 220 | Indicate Bearing Fault |
| 222 | Indicate Degraded bearing |

Execution of the acoustic-based bearing fault detection routine 200 may proceed as follows. The steps may be executed in a suitable order, and are not limited to the order described with reference to FIG. 2. As employed herein, the term "1" indicates an answer in the affirmative, or "YES", and the term "0" indicates an answer in the negative, or "NO". The routine 200 operates by monitoring of speed of a subject bearing member and contemporaneous acoustic data during operation of the vehicle 10 under conditions in which the rotatable member 22 associated with the machine bearing 20 may be rotating. This includes monitoring, via the on-vehicle microphone 26, an acoustic signal and coincidently monitoring, via position sensor 24, speed of the rotatable member 22 associated with the subject machine bearing 20. When the controller 30 determines that the rotatable member 22 is operating at or near a steady-state speed condition, a stream of data associated with a window of time is captured and stored. In one non-limiting embodiment, the window of time for data capture is 5 seconds. Parameters from the stream of data are loaded into memory for statistical analysis, as follows (204).

The parameters from the stream of data containing the acoustic and bearing member speed that are captured during a fixed period of time during steady-state operation is analyzed to determine a sound spectrogram, which is in the form of a time-frequency spectrum in one embodiment (206). Example analytical methods to perform the time-frequency spectrum for the stream of data include a short-time Fourier transform, a wavelet transform, a Kurtogram analysis, etc.

Figure 3:
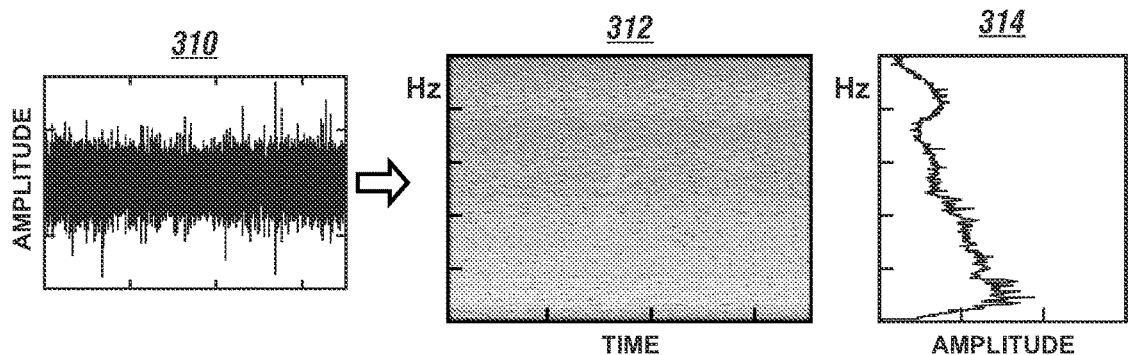
FIG. 3 graphically shows analytical processes related to acoustically monitoring of a subject machine bearing that was deemed healthy, in accordance with the disclosure.
Figure 4:
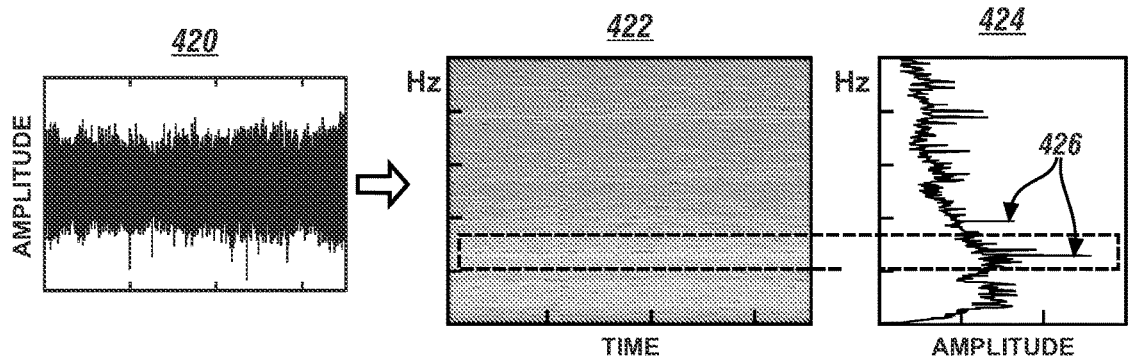
FIG. 4 graphically shows analytical processes related to acoustically monitoring of a subject machine bearing that was deemed faulty, in accordance with the disclosure.

Analytical processes for acoustically monitoring a machine bearing 20 are shown graphically with reference to FIGS. 3 and 4. FIG. 3 relates to operation of a subject machine bearing 20 that was deemed healthy, i.e., was absent a fault. Graph 310 graphically shows acoustic data for the subject machine bearing 20. The acoustic data is in the form of acoustic amplitude on the vertical axis in relation to elapsed time on the horizontal axis that was captured over a period of time under steady state operating conditions. Graph 312 graphically shows the acoustic data of Graph 310 after having been subjected to time-frequency spectrum analysis, and graph 314 graphically shows the time-frequency spectrum analysis after having been subjected to feature extraction analysis, wherein signal amplitude (dB) is shown on the horizontal axis and frequency (Hz) is shown on the vertical axis. There are no anomalies indicated by the time-frequency spectrum analysis and feature extraction of the acoustic data. FIG. 4 relates to operation of a subject machine bearing that exhibited a fault. Graph 420 graphically shows acoustic data for a subject machine bearing that was faulty. The acoustic data is in the form of acoustic amplitude on the vertical axis in relation to elapsed time on the horizontal axis that was captured over a period of time under steady state operating conditions. Graph 422 graphically shows the acoustic data of Graph 420 after having been subjected to time-frequency spectrum analysis, and graph 424 graphically shows the time-frequency spectrum analysis, wherein signal amplitude (dB) is shown on the horizontal axis and frequency (Hz) is shown on the vertical axis. Anomalies 426 in the form of peak amplitudes are indicated as a result of the time-frequency spectrum analysis of the acoustic data.

Figure 5B:
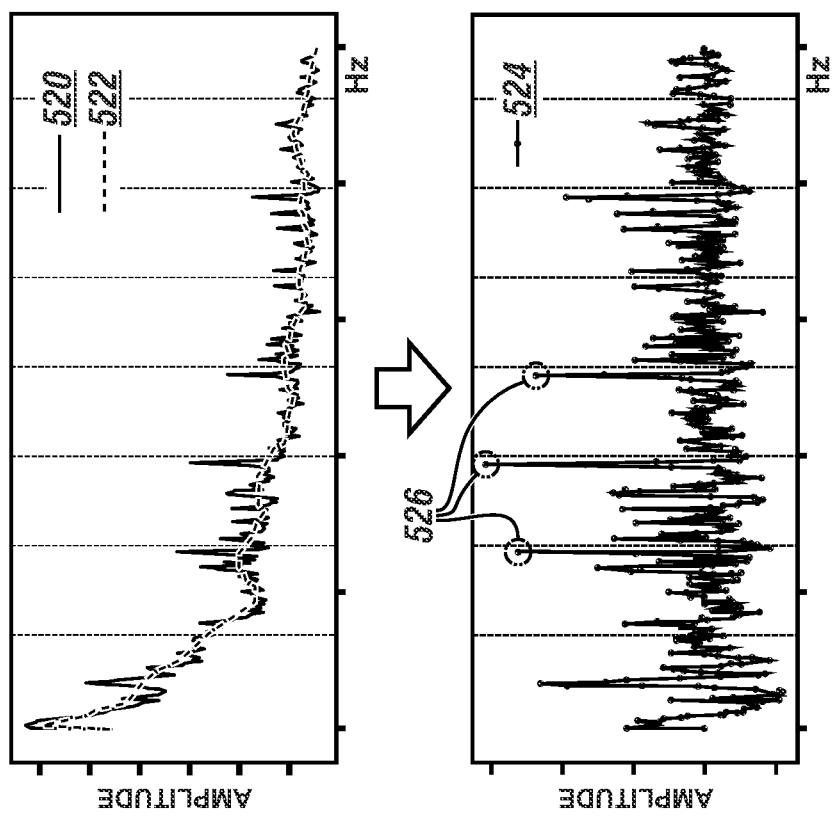
FIG. 5B graphically shows data illustrating an amplitude/frequency spectrum for acoustic data generated by a subject machine bearing that was deemed faulty, in accordance with the disclosure.
Figure 5A:
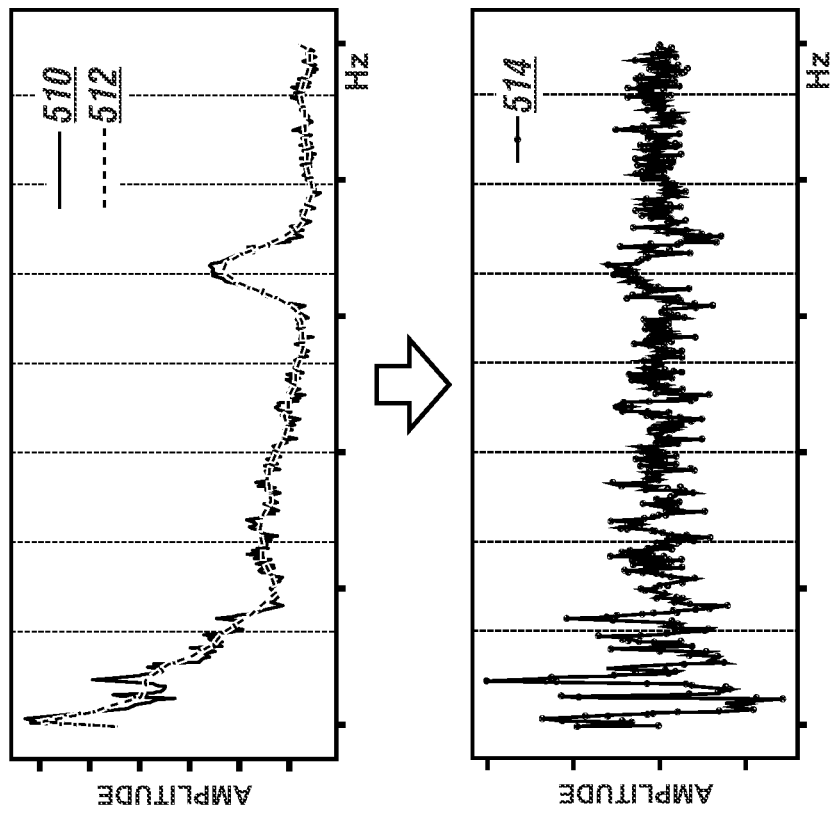
FIG. 5A graphically shows data illustrating an amplitude/frequency spectrum for acoustic data generated by a subject machine bearing that was deemed healthy, in accordance with the disclosure.

The sound spectrogram is subjected to feature extraction to detect whether extracted features from the sound spectrogram are consistent with a fault signature for the subject machine bearing 20. This may include, in one embodiment, determining an averaged spectrum for the sound spectrogram (208). Example data associated with this operation is illustrated with reference to FIGS. 5A and 5B. FIG. 5A graphically shows data illustrating an amplitude/frequency spectrum for acoustic data generated by a subject machine bearing 20 that was deemed healthy, i.e., was absent a fault. Line 510 graphically shows the acoustic data in the amplitude/frequency spectrum, and line 512 graphically shows the acoustic data in the amplitude/frequency spectrum after having been subjected to a smoothing operation, such as a moving average operation. FIG. 5B graphically shows data illustrating an amplitude/frequency spectrum for acoustic data generated by a subject machine bearing that was deemed faulty. Line 520 graphically shows the acoustic data in the amplitude/frequency spectrum, and line 522 graphically show the acoustic data in the amplitude/frequency spectrum after having been subjected to a smooth operation, such as a moving average operation.

A residual spectrum is determined by removing trend data from the averaged spectrum for the sound spectrogram (210). FIG. 5A also graphically shows line 514, which is a time-based arithmetic difference between line 512 and line 510. Line 514 is an example of the residual spectrum for the healthy bearing, and is depicted as a residual magnitude of audible sound in relation to frequency. FIG. 5B also graphically shows line 524, which is a time-based arithmetic difference between line 522 and line 520. Line 524 is an example of the residual spectrum for the faulty bearing. Residual outliers 526 are indicated, and occur at specific frequencies. Acoustic sound generated by rotation of a bearing has been shown to be time-invariant, and so the time signature can be removed from the data when the speed of the subject bearing is constant. The residual outliers 526 can be correlated to the speed of the subject bearing, with the anomalies occurring with peak amplitudes at harmonic frequencies, including a twelfth harmonic that occurs at a frequency corresponding to 12 times the speed (12X) and an eighteenth harmonic that occurs at a frequency corresponding to 18 times the speed of the subject bearing (18X) in one embodiment.

Frequency bands can be defined around the harmonic frequencies in the residual spectrum, and peak amplitudes of the residual spectrum within the frequency bands can be identified as features (212). The frequency bands are defined based upon accuracy and precision of the position sensor 24, and signal processing latencies associated with the position sensor 24 and the microphone 26. Maximum values of the residual spectrum are determined within the frequency bands, and may be identified as Feature 1 associated with the first frequency band and Feature 2 associated with the second frequency band.

Feature 1 is compared with a first threshold amplitude, T1, and Feature 2 is compared with a second threshold amplitude, T2 (214). The first and second threshold amplitudes T1, T2 are system- or vehicle-specific and harmonic-specific amplitudes that may be determined during system development and are preferably based upon statistical analysis of data associated with known healthy bearings and known faulty bearings.

When Feature 1 is less than the first threshold amplitude T1, and Feature 2 is less than the second threshold amplitude T2 (214)(1), the routine indicates that the subject bearing is healthy this iteration (216), and this iteration ends.

When either Feature 1 is greater than the first threshold amplitude T1, or Feature 2 is greater than the second threshold amplitude T2 (214)(0), the routine executes a second evaluation that includes Feature 1 being compared with a third threshold amplitude T3, and Feature 2 being compared with a fourth threshold amplitude T4 (218). The third and fourth threshold amplitudes T3, T4 are vehicle- and harmonic-specific amplitudes that may be greater than the first and second threshold amplitudes T1, T2, with allowance for hysteresis and other factors.

Figure 6:
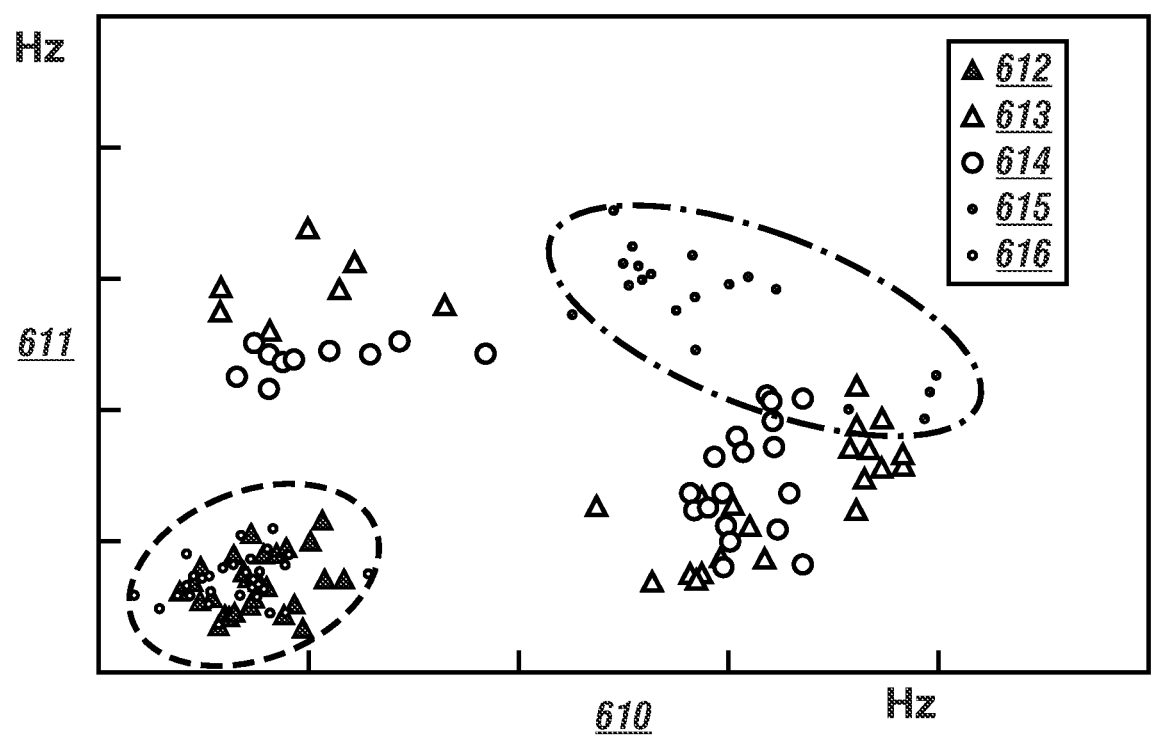
FIG. 6 graphically illustrates data associated with rotation of a bearing that includes residual amplitudes that have been extracted from sound data at harmonic frequencies, in accordance with the disclosure.

FIG. 6 graphically illustrates data associated with rotation of a bearing that includes residual amplitudes that have been extracted from sound data at harmonic frequencies. The data includes a known healthy bearing 612, a known faulty bearing under low, medium and high load conditions 613, 614, and 615, respectively, and under a condition of the healthy bearing with a secondary fault that may induce noise 616, plotted in context of a first frequency on the horizontal axis 610 and a second frequency on the vertical axis 611. The first frequency is a twelfth harmonic of the bearing member speed and the second frequency is an eighteenth harmonic of the bearing member speed, both of which are determined empirically. The results as shown indicate that there is a separation in the residual amplitudes between a known healthy bearing and a known faulty bearing. This separation can be advantageously employed by the acoustic-based bearing fault detection routine 200, including determining values for the first and second threshold amplitudes T1, T2 and the third and fourth threshold amplitudes T3, T4. It is appreciated that the selection of first frequency as a twelfth harmonic and the second frequency as an eighteenth harmonic is application-specific, and other harmonic frequencies may be selected for other applications based upon empirical analysis of data that can be captured in situ.

When Feature 1 is greater than the third threshold amplitude T3, and Feature 2 is greater than the fourth threshold amplitude T4 (218)(1), a fault associated with the subject bearing is indicated (220) and this iteration ends.

When either Feature 1 is less than the third threshold amplitude T3, or Feature 2 is less than the fourth threshold amplitude T4 (218)(0), degradation of the subject bearing is indicated (222), and this iteration ends.

In one embodiment, a single iteration of the acoustic-based bearing fault detection routine 200 may be executed in order to assess a state of health of the subject bearing, i.e., determine whether the subject bearing is healthy, degraded, or faulty. That assessment can be communicated to a person or another device for further action that is in accordance with the assessment. By way of a non-limiting example, in the event of detection of degradation or fault associated with the subject bearing, the result may be communicated to a vehicle operator or to a remotely located service center. Alternatively, multiple iterations of the acoustic-based bearing fault detection routine 200 may be executed in order to assess the bearing health, i.e., determine whether the subject bearing is healthy, degraded, or faulty. One example of such an operation is described with reference to an iterative acoustic-based bearing fault detection routine 700 that is described with reference to FIG. 7. Alternatively, another analytical method such as a supervised learning model that may include a support vector machine (SVM) may be employed to analyze the data to assess the bearing health to detect a bearing fault.

Figure 7:
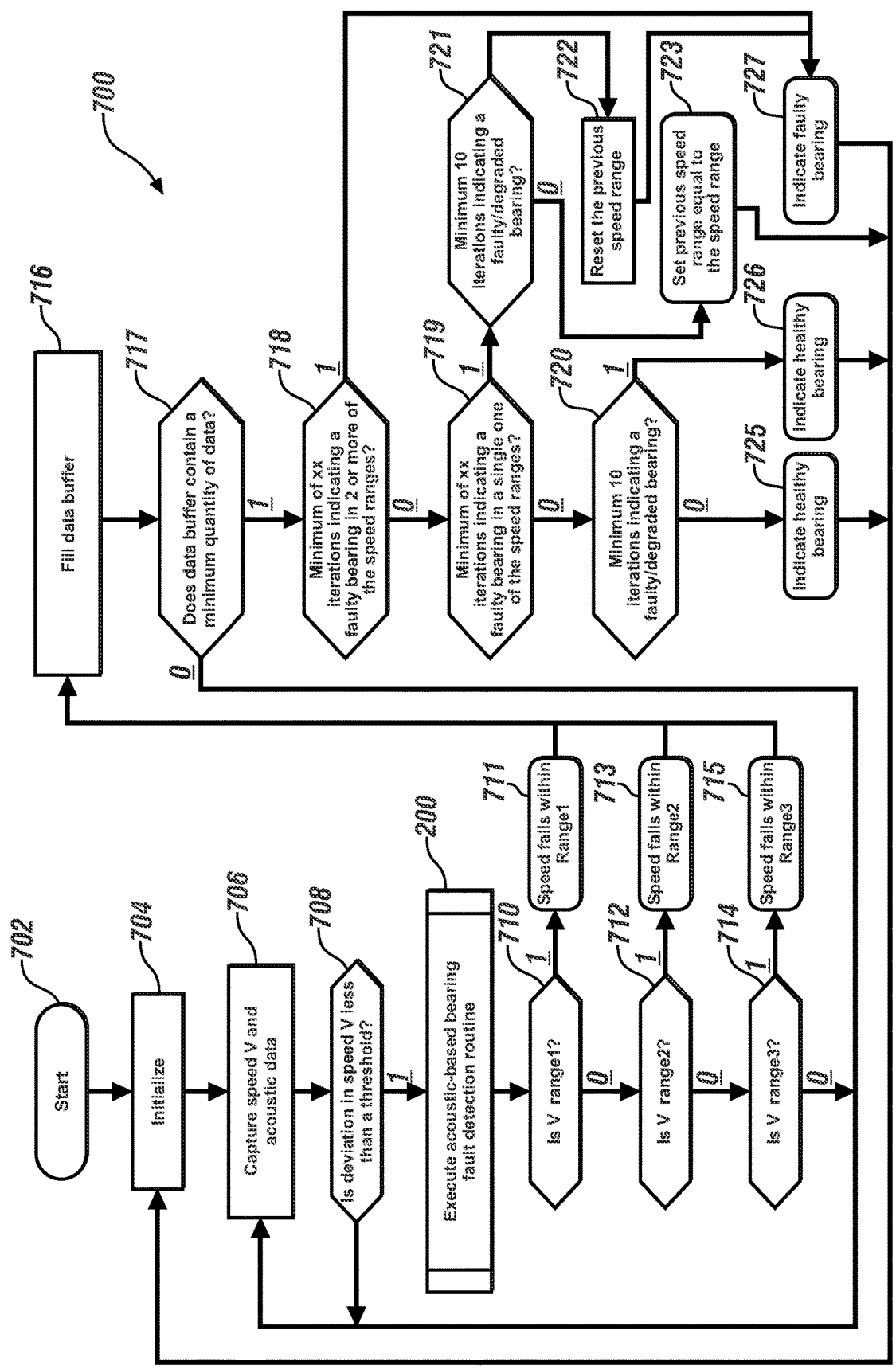
FIG. 7 schematically shows an iterative acoustic-based bearing fault detection routine that employs results from multiple iterations of the acoustic-based bearing fault detection routine described with reference to FIG. 2 in order to make a final determination about a state of health of the subject bearing, in accordance with the disclosure.

FIG. 7 schematically shows the iterative acoustic-based bearing fault detection routine 700 that employs the results of multiple iterations of the acoustic-based bearing fault detection routine 200, which includes capturing and evaluating data associated with a plurality of speed/load operating points in order to make a final determination about a state of health of the subject bearing. Table 2 is provided as a key wherein the numerically labeled blocks and the corresponding functions are set forth as follows, corresponding to the iterative acoustic-based bearing fault detection routine 700. The teachings may be described herein in terms of functional and/or logical block components and/or various processing steps. It should be realized that such block components may be composed of hardware, software, and/or firmware components that have been configured to perform the specified functions.

TABLE 2

| BLOCK | BLOCK CONTENTS |
|---|---|
| 702 | Start |
| 704 | Initialize data buffer, counter, and load parameters |
| 706 | Capture data including bearing member speed V and acoustic data for preset time period |
| 708 | Is deviation in bearing member speed V less than a threshold during the preset time period? |
| 200 | Execute acoustic-based bearing fault detection routine to determine state of health of subject bearing and bearing speed for this iteration |
| 710 | V ∈ range1?, range1 less than V1 |
| 711 | Speed falls within Range1 |
| 712 | V ∈ range2?, range2 greater than V1 and less than V2 |
| 713 | Speed falls within Range2 |
| 714 | V ∈ range3?, range3 greater than V2 |
| 715 | Speed falls within Range3 |
| 716 | Fill data buffer with state of health of subject bearing and bearing speed for each iteration |
| 717 | Does data buffer contain at least a minimum quantity of data (e.g., 15 datasets) |
| 718 | Is there a minimum of xx iterations indicating a faulty bearing, captured at 2 or more of the speed ranges, wherein xx is a calibratable value, such as 10? |
| 719 | Is there a minimum of xx iterations indicating a faulty bearing, captured at a single one of the speed ranges, wherein xx is a calibratable value, such as 10? |
| 720 | Is there a minimum of xx iterations indicating a faulty bearing or a degraded bearing? |
| 721 | Is the present speed range associated with the xx iterations indicating a faulty bearing the same as the previous speed range? |

TABLE 2-continued

| BLOCK | BLOCK CONTENTS |
|---|---|
| 722 | Reset the previous speed range |
| 723 | Set previous speed range equal to the speed range |
| 725 | Indicate final determination of healthy bearing |
| 726 | Indicate final determination of degraded bearing |
| 727 | Indicate final determination of faulty bearing |

Execution of the iterative acoustic-based bearing fault detection routine 700 may proceed as follows. The steps may be executed in a suitable order, and are not limited to the order described with reference to FIG. 7. As employed herein, the term "1" indicates an answer in the affirmative, or "YES", and the term "0" indicates an answer in the negative, or "NO".

The iterative acoustic-based bearing fault detection routine 700 periodically executes, including, e.g., executing once per vehicle trip when it is executed on-vehicle. Upon initiation (702), related data buffer, counter, and load parameters are cleared or initialized (704), and data capture is initiated (706), with the data capture occurring for a preset time period, e.g., 5 seconds, and including monitoring the speed of the bearing member and associated acoustic data.

The captured data is evaluated to determine whether deviation in the rotational speed of the bearing member during the preset time period is less than a threshold that indicates a steady-state speed, and if so (708)(1), execution of the acoustic-based bearing fault detection routine 200 may proceed. Otherwise (708)(0), the present data is discarded and data capture continues (706).

Each iteration, the acoustic-based bearing fault detection routine 200 generates outputs including a state of health of the subject bearing, i.e., one of healthy, degraded, or faulty, and an associated bearing speed. Steps 710, 711, 712, 713, 714, 715 and 716 are executed in order to capture data associated with the state of health of the subject bearing for the iteration in one of a plurality of speed ranges (range1, range2, range3), wherein the speed ranges are associated with calibratable speed levels V1 and V2. The data associated with the state of health of the subject bearing is captured into data buffers each iteration (716). The quantity of speed ranges and associated speed levels are calibratable and may be selectable as a design choice.

When the data buffer has sufficient quantity of data (717)(1), the results are evaluated (steps 718, 719, 720, 721, 722, 723) to make a final determination of the state of health of the subject bearing, i.e., one of a healthy bearing (725), a degraded bearing (726) or a faulty bearing (727). This iteration of the iterative acoustic-based bearing fault detection routine 700 ends or reinitiates at step 704.

Figure 8:
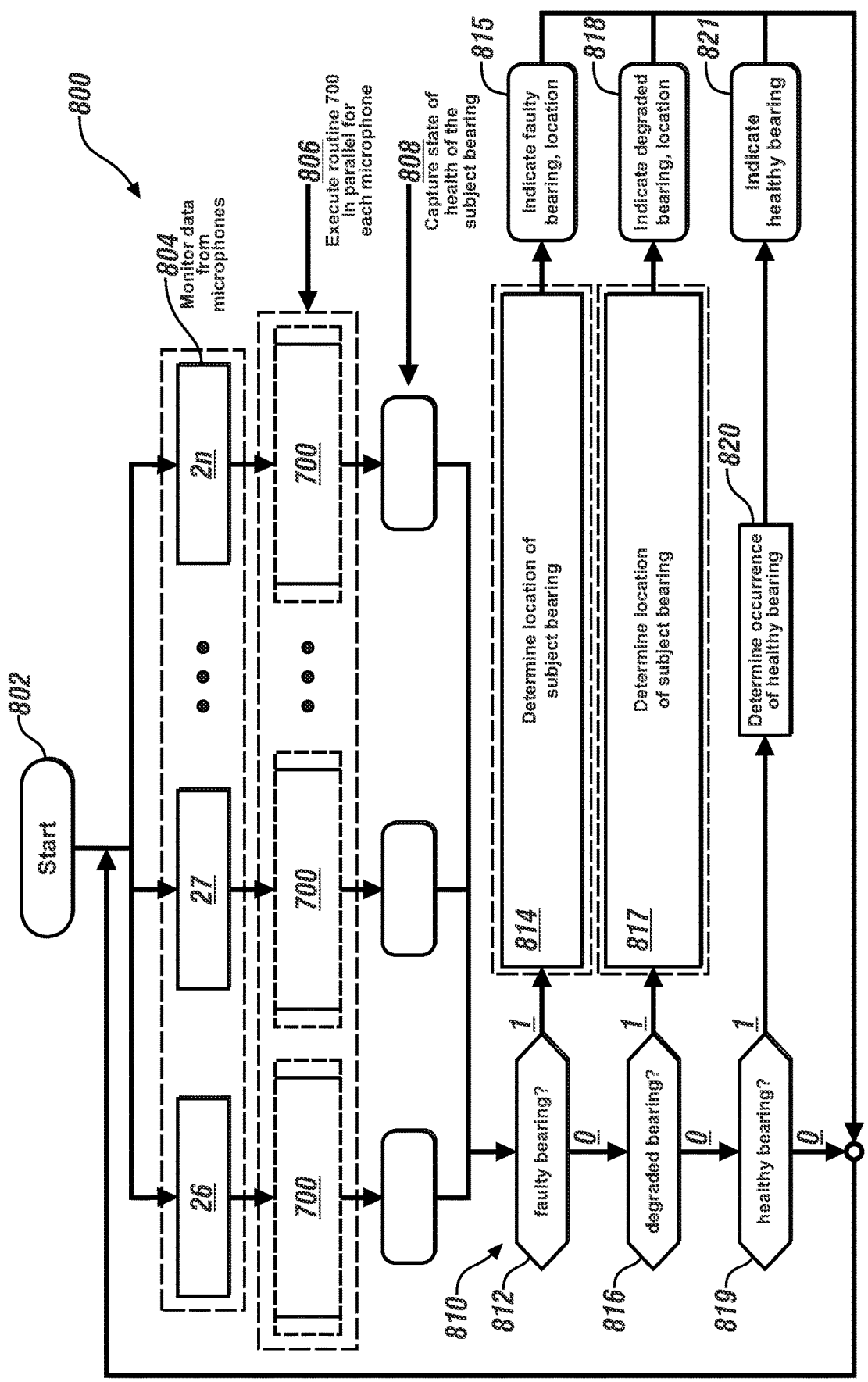
FIG. 8 schematically shows a multiple microphone acoustic-based bearing fault detection routine that employs acoustic data captured from multiple microphones that are disposed proximal to or in the vicinity of the subject bearing in order to make a final determination about a state of health of the subject bearing in accordance with the disclosure.

FIG. 8 schematically shows a multiple microphone acoustic-based bearing fault detection routine 800, which employs acoustic data captured from multiple microphones, e.g., microphone 26, second microphone 27, . . . , nth microphone 2n, wherein the nth microphone 2n indicates each of a third, fourth, fifth, etc. microphone, as described herein and shown with reference to FIG. 1. The microphones may be disposed proximal to or in the vicinity of the subject bearing for purposes of evaluation thereof to detect occurrence of a fault. The multiple microphone acoustic-based bearing fault detection routine 800 includes capturing and evaluating data associated with each of the n microphones, wherein the data is associated with a plurality of speed/load operating points, in order to make a final determination about a state of health of the subject bearing. Table 3 is provided as a key wherein the numerically labeled blocks and the corresponding functions are set forth as follows, corresponding to the multiple microphone acoustic-based bearing fault detection routine 800. The teachings may be described herein in terms of functional and/or logical block components and/or various processing steps. It should be realized that such block components may be composed of hardware, software, and/or firmware components that have been configured to perform the specified functions.

TABLE 3

| BLOCK | BLOCK CONTENTS |
|---|---|
| 802 | Start |
| 804 | Monitor data from microphones 1, 2, . . . n |
| 806 | Execute iterative acoustic-based bearing fault detection routine 700 in parallel for each of the microphones 1, 2, . . . n |
| 808 | Capture final determination of the state of health of the subject bearing from executions of routine 700 in parallel |
| 810 | Evaluate states of health |
| 812 | Does most severe final determination indicate faulty bearing? |
| 814 | Determine location of subject bearing |
| 815 | Indicate faulty bearing, location |
| 816 | Does most severe final determination indicate degraded bearing? |
| 817 | Determine location of subject bearing |
| 818 | Indicate degraded bearing, location |
| 819 | Does most severe final determination indicate healthy bearing? |
| 820 | Determine occurrence of healthy bearing |
| 821 | Indicate healthy bearing |

Execution of the multiple microphone acoustic-based bearing fault detection routine 800 may proceed as follows. The steps may be executed in a suitable order, and are not limited to the order described with reference to FIG. 8. As employed herein, the term "1" indicates an answer in the affirmative, or "YES", and the term "0" indicates an answer in the negative, or "NO".

The multiple microphone acoustic-based bearing fault detection routine 800 periodically executes, including, e.g., executing once per vehicle trip when it is executed on-vehicle. Upon initiation (802), speed data is captured and acoustic data is captured from multiple microphones, e.g., microphone 26, second microphone 27, . . . , nth microphone 2n (804). The iterative acoustic-based bearing fault detection routine 700 is executed to individually evaluate the data from each of the aforementioned microphones (806) and a final determination is made indicating the state of health of the subject bearing for each of the microphones, with such results being captured, stored and evaluated (808, 810).

When the most severe of the final determinations indicates occurrence of a faulty bearing (810)(1), location of the faulty bearing is determined based upon proximity of the relevant one of the microphones (814), and an output is generated and communicated that indicates occurrence of the faulty bearing and its location (815).

When the most severe of the final determinations indicates occurrence of a degraded bearing (816)(1), location of the degraded bearing is determined based upon proximity of the relevant one of the microphones (817), and an output is generated and communicated that indicates occurrence of the degraded bearing and its location (818).

When the most severe of the final determinations indicates occurrence of a healthy bearing (819)(1), occurrence of the healthy bearings is determined (820), and an output is generated and communicated that indicates occurrence of the healthy bearings (821).

Communication of the output indicating bearing health can be to an on-vehicle communication center, or to a remotely located service center via some form of wireless or wired communication device.

The concepts described herein may be executed on vehicles or other systems that have access to signal data from a microphone that is proximal to a rotatable member associated with a bearing, wherein the microphone may be disposed on-vehicle, or alternatively wherein the microphone may be disposed off-vehicle, such as in a service bay at a service center, or, alternatively, wherein the microphone is disposed as an element of another device such as a cellular phone that is located proximal to the vehicle. Thus, the concepts may be implemented on a vehicle having an in-cabin microphone without addition of another microphone or other hardware. The concepts may be employed to dynamically capture intermittent bearing noise to detect bearing degradation and predict an incipient bearing fault.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for monitoring a machine bearing that is disposed on a rotatable member of a vehicle, the method comprising:
    monitoring, via an on-vehicle microphone, an acoustic signal and monitoring, via a position sensor, a rotational speed of the rotatable member associated with the machine bearing;
    capturing the acoustic signal when the rotational speed of the rotatable member is at a steady-state condition;
    executing, via a controller, a time-frequency analysis of the acoustic signal to determine a sound spectrum;
    transforming the sound spectrum to a residual spectrum;
    extracting a first feature from the residual spectrum, wherein the first feature is within a first frequency band;
    extracting a second feature from the residual spectrum, wherein the second feature is within a second frequency band;
    determining a state of health associated with the machine bearing based upon the first and second features; and
    communicating, via the controller, the state of health of the machine bearing to a second controller.

2. The method of claim 1, further comprising capturing the acoustic signal for a preset window of time when the rotational speed is at the steady-state condition.

3. The method of claim 1, wherein the first frequency band includes a harmonic frequency of the rotational speed of the rotatable member.

4. The method of claim 1, wherein the second frequency band includes a harmonic frequency of the rotational speed of the rotatable member.

5. The method of claim 1, wherein transforming the sound spectrum to the residual spectrum comprises determining a moving average for the sound spectrum, and subtracting the moving average from the sound spectrum to determine the residual spectrum.

6. The method of claim 1, further comprising:
    capturing the acoustic signal when the rotational speed of the rotatable member is at the steady-state condition and is within a first speed range;
    extracting first and second features from a first residual spectrum associated with the acoustic signal when the rotational speed is within the first speed range;
    capturing the acoustic signal when the rotational speed of the rotatable member is at the steady-state condition and is within a second speed range;
    extracting third and fourth features from a second residual spectrum associated with the acoustic signal when the rotational speed is within the second speed range; and
    detecting a fault associated with the machine bearing based upon the first, second, third and fourth features.

7. The method of claim 1, wherein determining the state of health associated with the machine bearing based upon the first and second features comprises:
    detecting a fault or degradation associated with the machine bearing based upon the first and second features; and
    communicating, via the controller, the fault or the degradation associated with the machine bearing to a second controller.

8. A method for monitoring a machine bearing that is disposed on a rotatable member of a vehicle, the method comprising:
    monitoring, via a plurality of microphones, a plurality of acoustic signals proximal to the machine bearing and monitoring, via a position sensor, a rotational speed of the rotatable member associated with the machine bearing;
    capturing the plurality of acoustic signals when the rotational speed of the rotatable member is at a steady-state condition;
    for each of the acoustic signals monitored by the plurality of microphones:
    executing, via a controller, a time-frequency analysis of each of the acoustic signals to determine a corresponding sound spectrum;
    transforming each of the corresponding sound spectrums to a corresponding residual spectrum;
    extracting, for each residual spectrum, a first feature, wherein the first feature is associated with a first frequency band;
    extracting, for each residual spectrum, a second feature, wherein the second feature is associated with a second frequency band;
    detecting a fault associated with the machine bearing based upon the first features and the second features; and
    communicating, via the controller, the fault associated with the machine bearing to a second controller.

9. The method of claim 8, further comprising capturing the plurality of acoustic signals for a preset window of time when the rotational speed is at the steady-state condition.

10. The method of claim 8, wherein the first frequency band includes a harmonic frequency of the rotational speed of the rotatable member.

11. The method of claim 8, wherein the second frequency band includes a harmonic frequency of the rotational speed of the rotatable member.

12. The method of claim 8, wherein transforming each of the sound spectrums to a respective residual spectrum comprises determining a moving average for the respective sound spectrum, and subtracting the moving average from the respective sound spectrum to determine the respective residual spectrum.

13. A device, including:
    a machine bearing disposed on a rotatable member;
    a microphone disposed proximal to the machine bearing;
    a rotational position sensor disposed to monitor the rotatable member; and
    a controller, in communication with the rotational position sensor and the microphone, the controller including an instruction set, the instruction set executable to:
    monitor, via the microphone, an acoustic signal,
    monitor, via the rotational position sensor, a rotational speed of the rotatable member,
    capture the acoustic signal when the rotational speed of the rotatable member is at a steady-state condition;
    execute a time-frequency analysis of the acoustic signal to determine a sound spectrum,
    transform the sound spectrum to a residual spectrum,
    extract a first feature from the residual spectrum, wherein the first feature is within a first frequency band,
    extract a second feature from the residual spectrum, wherein the second feature is within associated with a second frequency band, and
    detect a fault associated with the machine bearing based upon the first and second features.

14. The device of claim 13, further comprising the instruction set executable to communicate the fault associated with the machine bearing to a second controller.

15. The device of claim 14, wherein the second controller is disposed remote from the device.

16. The device of claim 13, further comprising the controller configured to:
   capture the acoustic signal for a preset window of time when the rotational speed is at the steady-state condition; and
   execute a time-frequency analysis of the acoustic signal that is captured when the rotational speed is at the steady-state condition to determine the sound spectrum.

17. The device of claim 13, wherein the first and second frequency bands are harmonic frequencies of the rotational speed of the rotatable member.

18. The device of claim 13, wherein the instruction set executable to transform the sound spectrum to the residual spectrum comprises the instruction set executable to determine a moving average for the sound spectrum, and subtract the moving average from the sound spectrum to determine the residual spectrum.

* * * * *